US007550696B2

(12) United States Patent
Tanaka et al.

(10) Patent No.: US 7,550,696 B2
(45) Date of Patent: Jun. 23, 2009

(54) THAWING METHOD AND APPARATUS FOR ARTICLES TO BE THAWED

(75) Inventors: Makoto Tanaka, Saitama (JP); Takeshi Nishinomiya, Saitama (JP); Kenji Komori, Matsubara (JP)

(73) Assignees: Ajinomoto Co., Inc., Tokyo (JP); Hosoda Kougyo Co., Ltd., Yao-shi (JP)

( * ) Notice: Subject to any disclaimer, the term of this patent is extended or adjusted under 35 U.S.C. 154(b) by 316 days.

(21) Appl. No.: 11/525,852

(22) Filed: Sep. 25, 2006

(65) Prior Publication Data

US 2007/0068938 A1 Mar. 29, 2007

(51) Int. Cl.
*H05B 6/70* (2006.01)
*A47J 31/12* (2006.01)

(52) U.S. Cl. ....................... 219/697; 426/506; 426/524; 99/413

(58) Field of Classification Search ................. 219/637; 426/506, 524; 99/413
See application file for complete search history.

(56) References Cited

U.S. PATENT DOCUMENTS 3,402,053 A * 9/1968 Longe et al. ................ 426/506

FOREIGN PATENT DOCUMENTS

| | | |
|---|---|---|
| JP | 7-30082 | 6/1995 |
| JP | 2002-218959 | 8/2002 |
| JP | 2004-201597 | 7/2004 |
| JP | 2004-357627 | 12/2004 |
| JP | 2005-52022 | 3/2005 |

* cited by examiner

*Primary Examiner*—Shawntina Fuqua
(74) *Attorney, Agent, or Firm*—Oblon, Spivak, McClelland, Maier & Neustadt, P.C.

(57) ABSTRACT

This invention relates to a method of and an apparatus for thawing an object to be thawed. The method of thawing an object to be thawed according to the present invention comprises a step of generating a first stream (F1) inside of a reservoir (8) containing liquid by supplying additional liquid into the reservoir. The first stream flows to surround the object to be thawed introduced into the reservoir (8). The method further comprises a step of thawing the object to be thawed introduced into the reservoir (8) while it is rotated on its axis by the first stream (F1).

10 Claims, 3 Drawing Sheets

THAWING METHOD AND APPARATUS FOR ARTICLES TO BE THAWED

CROSS REFERENCES TO RELATED APPLICATIONS

This application claims priority to Japanese Patent Application No. 2005-278063, filed on Sep. 26, 2005.

FIELD OF THE INVENTION

The present invention relates to a thawing method and a thawing apparatus and in particular relates to those employing a reservoir.

BACKGROUND OF THE INVENTION

Objects to be thawed are made by collecting a plurality of marine products such as shrimps and shellfishes or the other products, especially food materials, and freezing them in a block shape. Apparatuses for thawing such objects to be thawed have been known, such apparatuses including a vacuum steam thawing apparatus for thawing objects to be thawed by containing them in a sealed process tank under reduced pressure and supplying steam into the process tank (Please refer to Patent Publication 1 below); a thawing apparatus for thawing objects to be thawed in a thawing tank containing water by ejecting a gas, made by mixing overheated steam with air, from a bottom of the tank (Please refer to Patent Publication 2 below); a thawing apparatus for thawing objects to be thawed in a thawing chamber by flowing high-humidity steam toward the objects (Please refer to Patent Publication 3 below); a microwave thawing apparatus for thawing frozen foods by irradiating the frozen foods with microwaves (Please refer to Patent Publication 4 below); and a thawing apparatus for thawing objects to be thawed in a thawing tank containing water by merely supplying water from a bottom of the tank to utilize convection in the tank (Please refer to Patent Publication 5 below).

Patent Publication 1: Japanese Patent Laid-open Publication No. 2004-357627

Patent Publication 2: Japanese Patent Laid-open Publication No. 2005-052022

Patent Publication 3: Japanese Patent Laid-open Publication No. 2004-201597

Patent Publication 4: Japanese Patent Laid-open Publication No. 2002-218959

Patent Publication 5: Japanese Patent Laid-open Publication No. 7-030082

In the thawing apparatuses disclosed in Patent Publication 1-4, a block-shaped object to be thawed including a plurality of frozen articles is continuously subjected to physical energy until the object has been thawed thoroughly. Concretely, such physical energy is steam in the Patent Publication 1, gas made by mixing overheated steam with air in the Patent Publication 2, high-humidity air in the Patent Publication 3 and microwaves in the Patent Publication 4. In this connection, although articles near a surface of the block have been already thawed in an earlier period after the thawing process starts, they continue to be subjected to the physical energy until the object is thawed thoroughly. Thus, the articles thawed in the earlier period may be damaged; for example, they may be broken into small pieces or their characteristics changed. As a result, there may be a difference in quality between articles thawed in the earlier period and those thawed in a final period and thus articles having a uniform quality cannot be obtained. In order to overcome this problem, there is a device for taking earlier thawed articles out before later thawed articles. However, not only a mechanism of such a device but also operation and maintenance thereof are very complicated Since the apparatus disclosed in the Patent Publication 5 merely causes convection of water, thawed articles may possibly not be damaged than those in Patent Publications 1-4. However, it takes much time to thaw an object to be thawed and thus the apparatus is not efficient.

It is therefore a first object of the present invention to provide a method of and an apparatus for efficiently thawing objects to be thawed without damaging them.

Further, it is a second object of the present invention to provide a method of and an apparatus for uniformly thawing a block-shaped object to be thawed including a plurality of frozen articles.

SUMARRY OF THE INVENTION

To achieve the above-mentioned first object, a method of thawing an object to be thawed according to the present invention comprises steps of generating a first stream inside of a reservoir containing liquid by supplying additional liquid into the reservoir, the first stream flowing to surround the object to be thawed introduced into the reservoir; and thawing the object introduced into the reservoir while it is rotated on its axis by the first stream.

In this thawing method, the first stream generated by supplying additional liquid into the reservoir flows to surround the object to be thawed introduced into the reservoir to rotate the object on its axis so that a condition in which the additional liquid evenly contacts surfaces of unthawed portions of the object is caused. This allows the object to be efficiently thawed without damaging it.

In the thawing method according to the present invention, preferably, the first stream flows in a cylindrical configuration extending in a horizontal and longitudinal direction, and the method further comprises steps of generating second streams flowing in the horizontal and longitudinal direction from opposite ends toward a middle portion within a center region inside of the first cylindrical-configuration stream; and moving the object to be thawed toward the middle portion by one of the second streams while the object is rotated on its axis by the first stream.

In this connection, the inventor has found that the second streams are made in the horizontal and longitudinal direction from opposite ends toward a middle portion within a center region inside of the first cylindrical-configuration stream by forming the first rotational stream in a cylindrical configuration extending in the horizontal and longitudinal direction. In this thawing method, when the object to be thawed is introduced into the first cylindrical-configuration stream at one end in the horizontal and longitudinal direction, the object is moved by one of the second streams to the middle portion in the horizontal and longitudinal direction where the second streams meet together while the object is rotated on its axis by the first stream. Subsequently, the object is thawed while it is rotated on its axis and rests in the middle portion in the horizontal and longitudinal direction.

Therefore, a location where the unthawed object is introduced into the reservoir is different from a location where the thawed object is taken out from the reservoir so that the object to be thawed can be supplied continuously.

In the thawing method according to the present invention, more preferably, the object to be thawed is a block-shaped object including a plurality of frozen articles and the method further comprises steps of generating a third stream flowing in the horizontal and longitudinal direction toward one end within a peripheral region of the first cylindrical-configuration stream; moving articles, which are separated from the object by thawing the object, to the peripheral region of the first cylindrical-configuration stream due to the first stream; and further moving the articles to the one end by the third stream to discharge them from the reservoir.

In this connection, the inventor has found that the third stream is made to flow in the horizontal and longitudinal direction toward one end within a peripheral region of the first cylindrical-configuration stream by providing a discharge opening for discharging the liquid in the reservoir at the one end or the vicinity thereof in the horizontal and longitudinal direction. This thawing method is suitable for the block-shaped object to be thawed including a plurality of frozen articles and thus the second object of the present invention can be achieved in addition to the first object thereof. Specifically, articles located near the surface of the object to be thawed are thawed earlier and separated from the object. The separated articles are moved to the peripheral region of the first stream by centrifugal force due to the first cylindrical-configuration stream and then are moved to the one end in the horizontal and longitudinal direction by the third stream. Subsequently, the articles moved to the one end are discharged, for example, through the discharge opening.

In this thawing method, earlier thawed articles are discharged from the reservoir earlier than later thawed articles so that the block-shaped object to be thawed including a plurality of articles can be thawed uniformly.

Further, to achieve the above-mentioned first object, a thawing apparatus for thawing an object to be thawed according to the present invention comprises a reservoir containing liquid and having a bottom surface and a pair of opposing side surface connected to the bottom surface; and a liquid-supplying device having at least one supply opening through which additional liquid is supplied to the reservoir to form a first stream flowing along one of the side surfaces, the bottom surface, the other of the side surfaces and a liquid surface; wherein the first stream flows to surround an object to be thawed introduced into the reservoir so that it is rotated on its axis.

In this thawing apparatus, similar to in the above-mentioned thawing method according to the present invention, the object to be thawed can be efficiently thawed without damaging it.

In this thawing apparatus, preferably, the at least one supply opening allows the liquid to be supplied along the liquid surface in the reservoir.

In this thawing apparatus, preferably, a plurality of the supply openings are disposed along the one of the side surfaces of the reservoir in the horizontal and longitudinal direction, or the at least one supply opening has a slit shape extending in the horizontal and longitudinal direction, so that the first stream flows in a cylindrical configuration extending in the horizontal and longitudinal direction, whereby second streams are generated, the second streams flowing in the horizontal and longitudinal direction from opposite ends toward a middle portion within a center region inside of the first cylindrical-configuration stream.

In this thawing apparatus, similar to in the above-explained thawing method according to the present invention, a location where the unthawed object is introduced into the reservoir may be different from a location where the thawed object is taken out from the reservoir so that the objects to be thawed can be thawed continuously.

In the thawing apparatus according to the present invention, one or the other side surface of the reservoir has a discharge opening for discharging the liquid in the reservoir at one end or vicinity thereof in the horizontal and longitudinal direction in the first cylindrical-configuration stream, whereby a third stream is generated, the third stream flowing toward the discharge opening within the peripheral region of the first cylindrical-configuration stream.

In this thawing apparatus, similar to the above-explained thawing method according to the present invention, when a block-shaped object to be thawed including a plurality of frozen articles is introduced into the reservoir, earlier thawed articles are discharged from the reservoir earlier than later thawed articles so that the articles can be thawed uniformly. Thus, the second object of the present invention can be achieved in addition to the first object thereof.

In the thawing apparatus having a plurality of supply openings according to the present invention, preferably, the liquid supply device has an adjusting device for adjusting respective flow rates of the liquid supplied from the plurality of supply openings.

In this thawing apparatus, when the flow rate of the liquid supplied from the each supply opening is changed by the adjusting device, a location where the second streams meet together can be changed so that a location where the object to be thawed rests can be changed.

In the thawing apparatus having a discharge opening according to the present invention, preferably, the object to be thawed is a block-shaped object and includes a plurality of frozen articles; and the thawing apparatus further comprises a separating device connected to the discharge opening and separating the articles from the liquid discharged through the discharge opening.

In the thawing apparatus, the thawed articles can be separated from the liquid and collected.

In the thawing apparatus having a discharge opening according to the present invention, preferably, the object to be thawed is a block-shaped object and includes a plurality of frozen articles; and the thawing apparatus further comprises an agitating device for agitating the liquid in the reservoir to allow articles dropping on the bottom surface of the reservoir after they are separated from the object to ride on the third stream.

In this thawing apparatus, by agitating the liquid in the reservoir, articles separated from the third stream and then resting on the bottom surface of the reservoir are moved to ride onto the third stream so that the number of articles not discharged through the discharge opening can be reduced.

The thawing method and apparatus according to the present invention can efficiently thaw objects to be thawed without damaging them.

Further, the thawing method and apparatus according to the present invention can uniformly thaw a block-shaped object to be thawed including a plurality of frozen articles.

DETAILED DESCRIPTION OF THE PREFERRED EMBODIMENTS

Now, first, second and third embodiments of a thawing apparatus according to the present invention will be explained.

Figure 1:
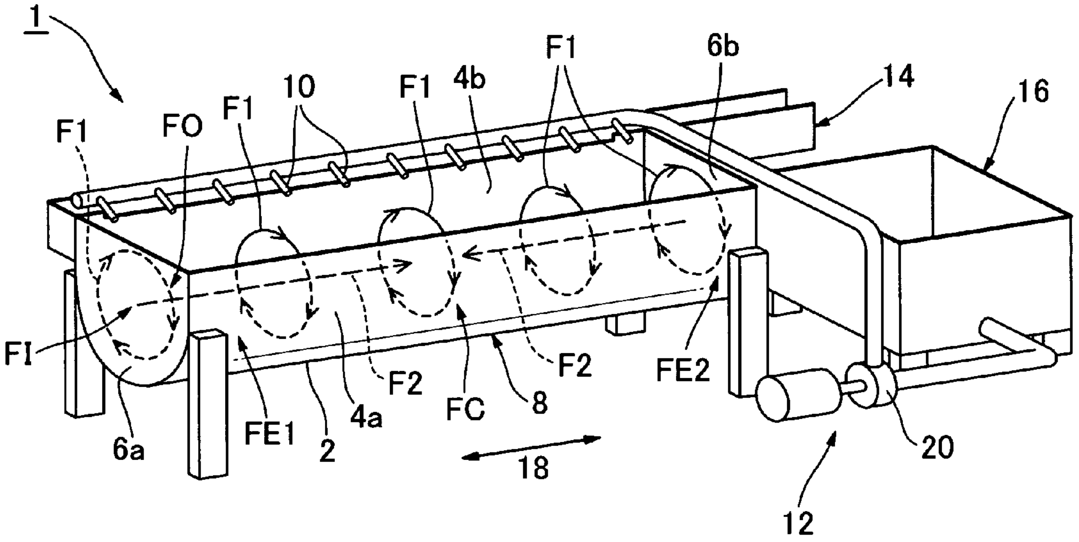
FIG. 1 is a schematically perspective view of a thawing apparatus which is a first embodiment of the present invention.

Firstly, referring to FIG. 1, a first embodiment of a thawing apparatus according to the present invention will be explained. FIG. 1 is a schematically perspective view of a thawing apparatus which is a first embodiment of the present invention.

As shown in FIG. 1, a thawing apparatus 1 has a reservoir filled with liquid and having a bottom surface 2 and two pairs of side surfaces 4*a*, 4*b*, 6*a*, 6*b* connected to the bottom surface 2; a liquid supply device 12 having supply openings 10 for supplying additional liquid into the reservoir 8 so that a first stream F1 flowing along the side surface 4*a*, the bottom surface 2, the side surface 4*b* and a liquid surface is generated; an overflow receiver 14 for receiving the liquid overflowed from the reservoir 8 and discharging it; and a sub tank 16 for storing the liquid discharged from the overflow receiver 14.

The side surfaces 4*a*, 4*b* are larger than the side surfaces 6*a*, 6*b*. The reservoir 8 is formed in a laterally longitudinal configuration in a horizontal and longitudinal direction 18. A shape of a cross section of the bottom surface 2 is semicircular. A plurality of supply openings 10 are arranged in the horizontal and longitudinal direction 18 along an upper edge of the side surface 4*b* so that the first stream F1 flows in a cylindrical configuration extending in the horizontal and longitudinal direction 18. Further, the supply openings 10 are directed so that liquid is supplied along the liquid surface in the reservoir 8. The overflow receiver 14 is disposed along the whole upper edge of the side surface 4*b*. The liquid supply device 12 is connected to the sub tank 16 and has a pump 20 for supplying liquid in the sub tank 16 to the supply openings 10. The liquid is preferably water.

Next, how the thawing apparatus 1 which is the first embodiment of the present invention is activated will be explained.

The reservoir 8 is filled with liquid, and the pump 20 of the liquid supply device 12 is activated to supply liquid in the sub tank 16 through the supply openings 10. The liquid supplied through the supply openings 10 is directed along the liquid surface in the reservoir to generate a first stream F1 inside of the reservoir, the first stream flowing to surround an object to be thawed introduced later into the reservoir 8. Since the liquid is supplied through the plurality of supply openings 10 arranged in the horizontal and longitudinal direction 18, the first stream F1 flows in a cylindrical configuration. In order to facilitate understanding the present invention, in FIG. 1, the first stream F1 is shown as circular streams. However, the first stream F1 actually flows, for example, in a spiral configuration and is a stream sufficient to rotate on its axis an object to be thawed introduced into the reservoir later. Flow rates of the liquid through the respective supply openings 10 are preferably the same. The liquid supplied through the supply openings 10 is preferably overflowed from the whole upper edge of the side surface 4*b* of the reservoir 8.

At the same time the first stream is created, two second streams F2 are generated in the center region F1 inside of the first cylindrical-configuration stream F1, the second streams F2 flowing in the horizontal and longitudinal direction from the opposite ends FE1, FE2 toward a middle portion FC. The second streams F2 meet together at the middle portion FC.

Under a condition in which the first stream F1 and the second streams F2 are generated, when an object to be thawed is introduced into the reservoir 8, for example, at the end FE1, the first stream F1 flows to surround the object so that the object rotates on its axis. In other words, supply rates of the liquid from the respective supply openings 10 are determined so that the first stream F1 causes the object to be rotated on its axis. Further, the second stream F2 on a side of the end FE1 moves the object rotating on its axis toward the middle portion FC. Since the two second streams F2 meet together at the middle portion FC, the object is moved thereto and then rests thereat while it rotates on its axis.

The rotation of the object to be thawed due to the first stream F1 makes a state in which the liquid supplied through the supply openings 10 always and evenly contacts surfaces of the object to be thawed. As a result, the chances of the object contacting cooler liquid in the reservoir 8 cooled by the object itself decrease, while the chances of the object contacting warmer liquid supplied through the supply openings 10 increase so that the object is thawed efficiently and rapidly. Further, since the liquid supplied through the supply openings 10 is water, it is unlikely that the object to be thawed will be damaged.

A next object to be thawed can be introduced into the reservoir 8 before the previous object has been thawed completely. The next object is moved to a location short of the middle portion FC by the second stream F2 and remains there until the previous object is removed therefrom.

Figure 2:
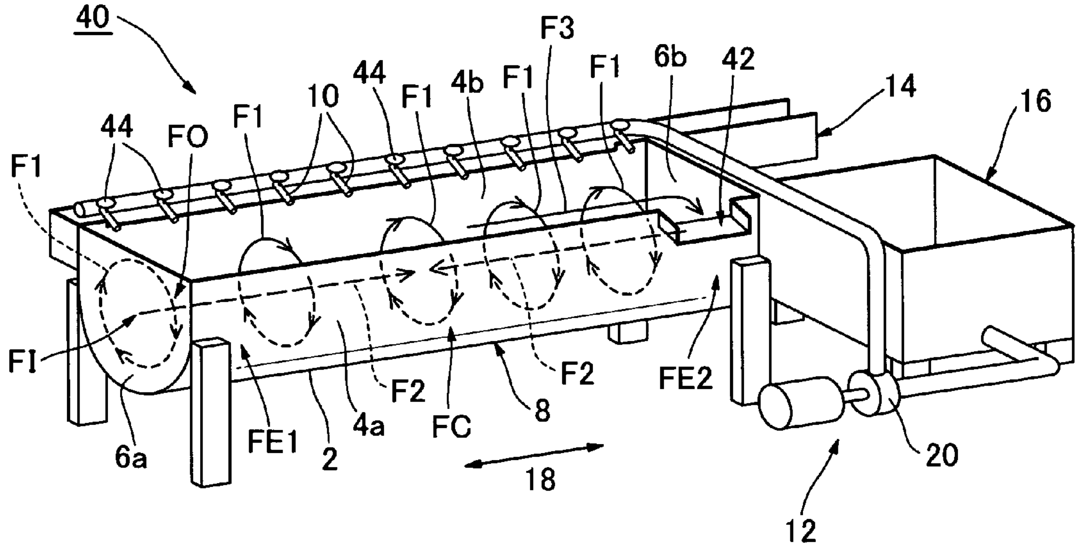
FIG. 2 is a schematically perspective view of a thawing apparatus which is a second embodiment of the present invention.

Next, referring to FIG. 2, a second embodiment of a thawing apparatus according to the present invention will be explained. FIG. 2 is a schematically perspective view of a thawing apparatus which is a second embodiment of the present invention. A thawing apparatus of the second embodiment has the same components as those of the first embodiment except that the second embodiment has a discharge opening 42 and an adjusting device 44 explained later. Therefore, in FIG. 2, the components of the second embodiment which correspond to components of the first embodiment are given the same reference numerals as those given to corresponding components in the first embodiment.

A thawing apparatus 40 which is the second embodiment of the present invention has a discharge opening 42 disposed at the end FE2 of the side surface 4*a* of the reservoir 8, and an adjusting device 44 for adjusting strength of a liquid flow supplied through a plurality of supply openings 10.

The discharge opening 42 is preferably disposed in the side surface 4*a* opposite to the side surface 4*b* along which the overflow receiver 14 is disposed. In the second embodiment, the discharge opening 42 is defined by a cutout made by removing an upper edge of the side surface 4*a*.

The adjusting device 44 is concretely defined by valves disposed at the respective supply openings 10.

Next, how to activate the thawing apparatus 40 which is the second embodiment of the present invention will be explained.

In the thawing apparatus 40 of the second embodiment, in addition to the first stream F1 and the second streams F2 generated in the thawing apparatus 1 of the first embodiment, a third stream F3 is generated as explained later. Regarding the first stream F1 and the second streams F2, since how they are generated in the second embodiment is the same as that in the first embodiment, explanations thereof are omitted.

The third stream F3 is a stream toward the discharge opening 42 at a periphery region FO of the first cylindrical-configuration stream F1. Preferably, the third stream F3 is a stream flowing from the one end FE1 to the other end FE2. In FIG. 2, the third stream F3 is shown by a straight line, but an actual stream toward the discharge opening 42 forms a spiral configuration because the third stream F3 is combined with the first stream F1.

Due to the generation of the third stream F3, a location where the two second streams F2 meet together may be shifted from the middle portion FC. In this case, by individually adjusting each strength of the liquid flow supplied through the respective supply openings 10 by means of the adjusting device 44, the location where the second streams F2 meet together can be the middle portion FC. Specifically, when locations with a stronger liquid flow and a weaker liquid flow coexist together along the horizontal and longitudinal direction 18 in the reservoir 8 by changing respective flow rates of liquid supplied through the supply openings 10 and respective opening areas of the supply openings 10, the second streams F2 meet together at a location where the liquid flow is stronger. As a result, an object to be thawed introduced into the reservoir 8 rests at the location where the liquid flow is stronger.

Similar to the first embodiment, when a block-shaped object to be thawed including a plurality of frozen articles is introduced into the reservoir 8 at the end FE1 opposed to the discharge opening 42, the first stream F1 rotates the object on its axis while the second stream F2 moves the object toward the middle portion FC. The first stream F1 allows the liquid supplied through the supply openings 10 and the object to be heat-exchanged with each other and then the object is thawed accordingly from its surface. Thus, articles near the surface of the object are thawed and separated from the object to become discrete. As a result, a state of the middle portion FC in which the block-shaped object become rather small and rotates along with separated articles is created.

The separated articles are gradually moved toward the periphery region FO by centrifugal force due to the first stream F1. The articles moved to the periphery region FO are transported to the discharge opening 42 along the periphery region FO of the first stream F1 by the third stream F3 while they are rotated and then discharged through the discharge opening 42 along with the liquid. The articles separated from the periphery of the object to be thawed are discharged smoothly through the discharge opening 42 by the first stream F1 and the third stream F3, namely, in such a way that earlier separated articles are discharged earlier.

After the object to be thawed is moved to the middle portion FC, since there is no object to be thawed at the end FE1 and no articles separated from the object are moved thereto, another object to be thawed next is introduced into the reservoir at the end FE1. The next object is thawed similarly to the object previously introduced into the reservoir 8.

In the thawing apparatus 40 of the second embodiment, when the block-shaped objects to be thawed including a plurality of frozen articles are continuously introduced into the reservoir to thaw them, thawed articles are discharged rapidly through the discharge opening 42 in such a substantially automatic way that earlier thawed articles are discharged earlier.

The block-shaped object to be thawed may include foreign matters, for example, fish scales, pieces of wood, hair and so on. These foreign mattes are also thawed with the articles. In this connection, preferably, such foreign matters are discharged through the discharge opening 42 without tangling with or being attached to the articles by actions of the first stream F1, the second stream F2, the third stream F3 and combination thereof. In the conventional thawing method and apparatus, a lot of work and time are needed to remove foreign matters tangled with or attached to the articles. On the contrary, in the present invention, the articles and foreign matters can be discharged in a separated state if streams sufficient to separate them from each other are generated. Thus, although the articles and foreign matters are flowed out at the same time through the discharge opening 42 in the present embodiment, they can be easily separated from each other later.

Figure 3:
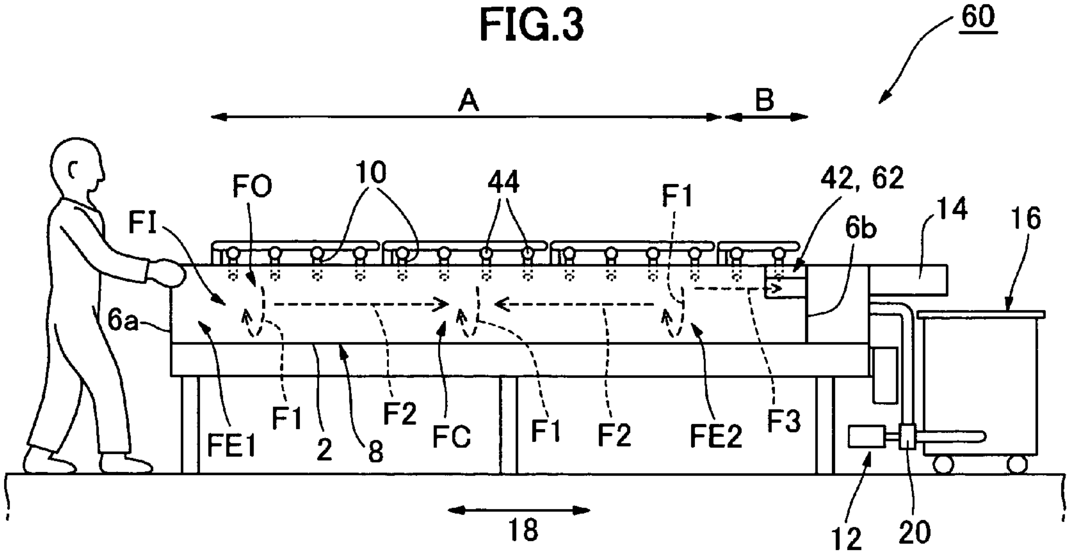
FIG. 3 is a front view of a thawing apparatus which is a third embodiment of the present invention.
Figure 4:
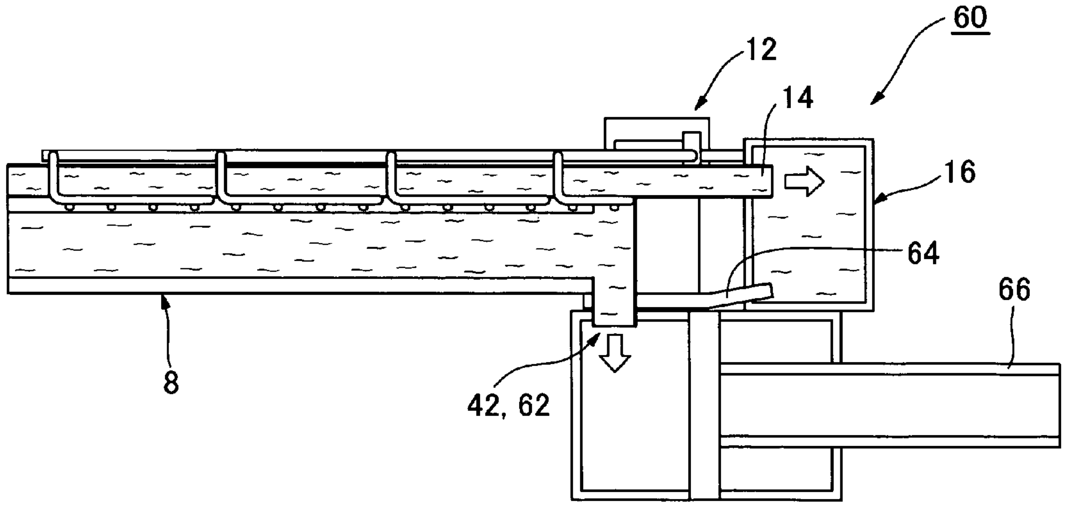
FIG. 4 is a plan view of the thawing apparatus shown in FIG. 3.
Figure 5:
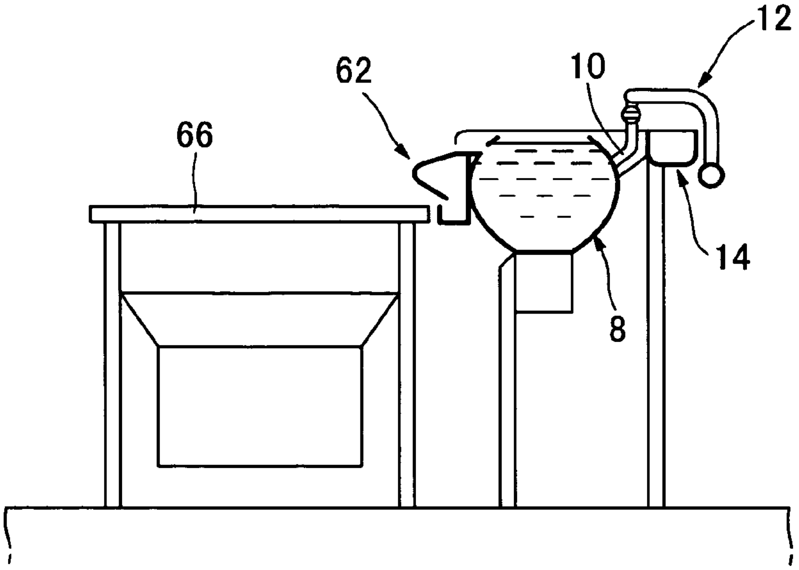
FIG. 5 is a side view of the thawing apparatus shown in FIG. 3.
Figure 6:
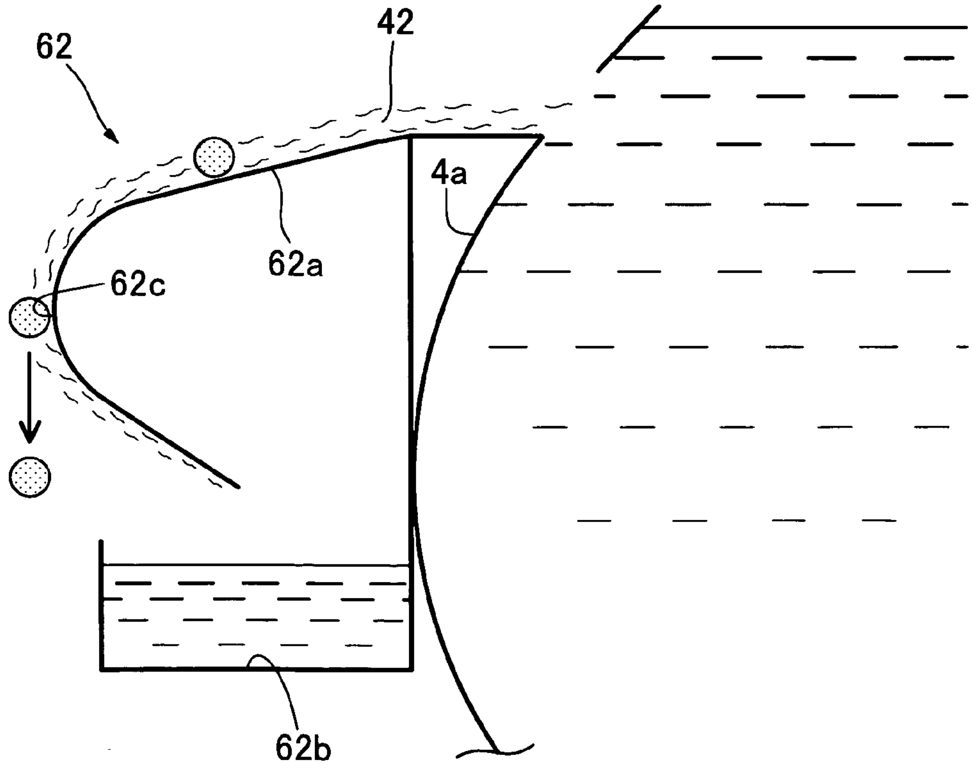
FIG. 6 is an enlarged view of a separating device.

Next, referring to FIGS. 3-6, a third embodiment of the thawing apparatus according to the present invention will be explained. FIG. 3 is a front view of an apparatus which is a third embodiment of the present invention. FIG. 4 is a plan view of the thawing apparatus shown in FIG. 3, and FIG. 5 is a side view thereof. FIG. 6 is an enlarged view of a separating device explained later.

The thawing apparatus of the third embodiment has components similar to those of the thawing apparatus 40 of the second embodiment except that the third embodiment has a separating device 62, an agitating device 64 and an article discharging device 66 explained later. Thus, the components of the third embodiment which correspond to components of the second embodiment are given the same reference numerals as those given to the corresponding components in the second embodiment, and explanations of such corresponding components thereof are omitted. Only components of the third embodiment different from those of the second embodiment will be explained.

The thawing apparatus 60 has a separating device 62 for separating articles and the liquid discharged through the discharge opening 42 from each other, an agitating device 64 for agitating the liquid in the reservoir 8 for articles accumulated on the bottom 2 of the reservoir 8 after they are separated from the object to be thawed to ride onto the third stream F3, and an article discharging device 66 for discharging the articles separated by the separating device 62.

As shown in FIG. 3, in the third embodiment, the first stream F1 is formed in a region A. In a region B adjacent to the region A, the first stream F1 is not formed and instead the discharge opening 42 and the agitating device 74 are provided in the region B. The agitating device 64 has a supply nozzle (not shown) which can emit a strong liquid flow upward from the bottom surface 2 of the reservoir 8. Further, as shown in FIG. 6, the separating device 62 has a predetermined R-shaped plate 62*a* connected to the discharge opening 42 and a receiver 62*b* for collecting the liquid. The plate 62*a* has a tip portion 62*c* protruding laterally.

Next, a way of operating the thawing apparatus 60 which is the third embodiment of the present invention will be explained.

Since the third embodiment is similar to the second embodiment regarding a way of forming the first stream F1, the second stream F2 and the third stream F3, explanations thereof and of a way of thawing the object to be thawed are omitted.

Among the articles separated from the object to be thawed, there may be articles having shapes which tend to make it different for the articles to ride onto a liquid stream and articles having a relatively heavy mass, and they may rest on or above the bottom surface 2 of the reservoir 8 depending on the strength of the liquid streams in the reservoir 8. Especially, such rest often occurs in the region B. In this case, by supplying a liquid flow from the supply nozzle (not shown) of the agitating device 64, the articles are forced upward from the bottom surface 2. Further, another stream flowing from the supply nozzle (not shown) to the discharge opening 42 is caused to flow. As a result, the articles resting on or above the bottom surface 2 can be discharged from the discharge opening 42.

The liquid and the articles are discharged together through the discharge opening 42. The plate 62*a* of the separating device 62 allows the liquid discharged through the discharge opening 42 to travel without the liquid separating from the plate 62*a* due to surface tension of the liquid. On the other hand, the articles discharged through the discharge opening 42 are separated from the plate 62*a* at the R-shaped tip 62*c* to fall downward due to gravity.

In this way, the thawing apparatus 60 of the third embodiment can continuously and rapidly thaw the block-shaped objects to be thawed and can continuously and rapidly discharge the articles separated from the object so that earlier thawed articles are discharged earlier.

The embodiments of the present invention have been explained, but the present invention is not limited to the above-mentioned embodiments and it is apparent that the embodiments can be changed within the scope of the present invention set forth in the claims.

In the above-mentioned embodiments, although the plurality of supply openings 10 are employed in the horizontal and longitudinal direction 18, one supply opening having a slit shape extending in the horizontal and longitudinal direction 18 can be employed so long as the first stream F1 flows in a cylindrical configuration. Further, the plurality of supply openings 10 may have respective slit shapes.

Further, in the above-mentioned embodiments, although the liquid is supplied through the supply opening 10 along the surface of the liquid in the reservoir 8, the first stream may flow in the reverse direction, namely, the liquid may be supplied through the supply opening 10 along the side surface 4*b* of the reservoir 8.

In the above-mentioned embodiments, although the overflow receiver 14 is disposed along the side surface 4*b*, it may be disposed along the side surface 4*a*.

In the above-mentioned embodiments, the adjusting device 44 for adjusting strength of liquid flow supplied through the supply opening 10 is defined by flow rate adjusting valves. However, the device may be defined by members of the supply opening 10 to revise a shape of the opening.

In the above-mentioned embodiments, in order to adjust a location where the object to be thawed rests, the strength of the liquid flow supplied through the supply openings 10 is adjusted. However, in order to move the object to be thawed in a first-in first-out order in the horizontal and longitudinal direction, strength of the liquid flow may be adjusted so that the location where strength of the liquid flow supplied through the supply opening is shifted in a first-in first-out order.

In the second embodiment, the following matter was explained: when a block-shaped object to be thawed includes foreign matters such as fish scales, pieces of wood, hair and so on in addition to the articles, the articles and the foreign matters are discharged in the separated state. Also in the first embodiment and the like, the articles and the foreign matters can be separated from each other so long as the first stream is a stream sufficient to separate them from each other.

Further, in the above-mentioned embodiments, although the reservoir 8 is filled with liquid, it may not be filled with liquid when the first stream is generated.

What is claimed is:

1. A method of thawing an object to be thawed comprising:

generating a first stream inside of a reservoir containing liquid by supplying additional liquid into said reservoir, wherein said first stream flows in a cylindrical configuration extending in a horizontal and longitudinal direction, said first stream flowing to surround said object to be thawed introduced into said reservoir;

generating a second stream flowing in the horizontal and longitudinal direction from opposite ends toward a middle portion within a center region inside of said first cylindrical-configuration stream;

moving said object to be thawed toward said middle portion by said second stream while said object to be thawed is rotated on its axis by said first stream; and thawing said object to be thawed introduced into said reservoir while it is rotated on its axis by said first stream.

2. The method according to claim 1, wherein said object to be thawed is a block-shaped object comprising a plurality of frozen articles; and said method further comprises:

generating a third stream flowing in the horizontal and longitudinal direction toward one end within a peripheral region of said first cylindrical-configuration stream;

moving articles, which are separated from said object to be thawed by thawing, to the peripheral region relative to said first cylindrical-configuration stream by said first stream, and further moving said articles to the one end by said third stream to discharge them from said reservoir.

3. A thawing apparatus for thawing an object to be thawed comprising:

a reservoir capable of containing liquid and having a bottom surface and a pair of opposing side surfaces connected to said bottom surface; and a liquid-supplying device comprising a plurality of supply openings disposed along one of said side surfaces of the reservoir in a horizontal and longitudinal direction so that when additional liquid is supplied to said reservoir a first stream flowing along one of said side surfaces, said bottom surface, the other of said side surfaces and a liquid surface in a cylindrical configuration extending in the horizontal and longitudinal direction is formed and second streams are generated, said second streams flowing in the horizontal and longitudinal direction from opposite ends toward a middle portion within a center region inside of said first cylindrical-configuration stream;

wherein the when said additional liquid is supplied in to said reservoir, said first stream flows to surround an object to be thawed introduced into said reservoir so that it is rotated on its axis.

4. The thawing apparatus according to claim 3, wherein said at least one supply opening allows liquid to be supplied along the liquid surface in said reservoir.

5. A thawing apparatus for thawing an object to be thawed comprising:

a reservoir capable of containing liquid and having a bottom surface and a pair of opposing side surfaces connected to the bottom surface; and a liquid-supplying device comprising at least one supply opening through which additional liquid may be supplied to said reservoir to form a first stream flowing along one of said side surfaces, said bottom surface, the other of said side surfaces and a liquid surface;

wherein said first stream flows to surround an object to be thawed when introduced into said reservoir so that it is rotated on its axis wherein said at least one supply opening has a slit shape extending in the horizontal and longitudinal direction so that when said additional liquid is supplied to said reservoir said first stream flows in a cylindrical configuration extending in the same direction, whereby second streams are generated, said second streams flowing in the horizontal and longitudinal direction from opposite ends toward a middle portion within a center region inside of said first cylindrical-configuration stream.

6. The thawing apparatus according to claim 3, wherein one or the other of said side surface of said reservoir has a discharge opening for discharging liquid from said reservoir at one end or vicinity thereof in the horizontal and longitudinal direction in said first cylindrical-configuration stream, whereby when liquid is discharged a third stream is generated, said third stream flowing toward said discharge opening within the peripheral region of said first cylindrical-configuration stream.

7. The thawing apparatus according to claim 5, wherein one or the other of said side surface of said reservoir has a discharge opening for discharging liquid from said reservoir at one end or vicinity thereof in the horizontal and longitudinal direction in said cylindrical-configuration stream, whereby when liquid is discharged a third stream is generated, said third stream flowing toward said discharge opening within the peripheral region of said first cylindrical-configuration stream.

8. The thawing apparatus according to claim 3, wherein said liquid supply device has an adjusting device for adjusting respective flow rates of liquid supplied from said plurality of supply openings.

9. The thawing apparatus according to claim 6, wherein said thawing apparatus further comprises a separating device connected to said discharge opening for separating articles from the liquid discharged through said discharge opening, said articles being first being separated from said object to be thawed when said object to be thawed is a block-shaped object and comprises a plurality of frozen articles.

10. A thawing apparatus according to claim 6, wherein said thawing apparatus further comprises an agitating device for agitating liquid in said reservoir to allow articles which drop on said bottom surface of said reservoir to ride on said third stream, said articles being first being separated from said object to be thawed when said object to be thawed is a block-shaped object and comprises a plurality of frozen articles.

* * * * *

UNITED STATES PATENT AND TRADEMARK OFFICE

CERTIFICATE OF CORRECTION

PATENT NO. : 7,550,696 B2
APPLICATION NO. : 11/525852
DATED : June 23, 2009
INVENTOR(S) : Tanaka et al.

It is certified that error appears in the above-identified patent and that said Letters Patent is hereby corrected as shown below:

On the title page, Item (30), The Foreign Application Priority Data has been omitted. Item (30) should read:

Item -- (30) Foreign Application Priority Data

Sep. 26, 2005 (JP) ................................................2005-278063 --

Signed and Sealed this

Fourth Day of August, 2009

JOHN DOLL
*Acting Director of the United States Patent and Trademark Office*